(12) United States Patent
Aguilar Mendez et al.

(10) Patent No.: US 10,487,593 B2
(45) Date of Patent: Nov. 26, 2019

(54) PROTECTOR WITH A FLEXIBLE GASKET FOR THE MALE OR FEMALE END OF A COMPONENT OF A THREADED TUBULAR CONNECTION

(71) Applicant: VALLOUREC OIL AND GAS FRANCE, Aulnoye-Aymeries (FR)

(72) Inventors: Jose Antonio Aguilar Mendez, Veracruz (MX); Gerardo Manuel Magallanes Montalvo, Veracruz (MX); Karim Bousbaine, Badevel (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 15/538,754

(22) PCT Filed: Dec. 18, 2015

(86) PCT No.: PCT/FR2015/053632
§ 371 (c)(1),
(2) Date: Jun. 22, 2017

(87) PCT Pub. No.: WO2016/102847
PCT Pub. Date: Jun. 30, 2016

(65) Prior Publication Data
US 2017/0370160 A1  Dec. 28, 2017

(30) Foreign Application Priority Data

Dec. 23, 2014 (FR) ...................................... 14 63225

(51) Int. Cl.
*F16L 57/00* (2006.01)
*E21B 17/00* (2006.01)
(Continued)

(52) U.S. Cl.
CPC ............ *E21B 17/006* (2013.01); *B65D 59/06* (2013.01); *E21B 17/043* (2013.01); *F16L 15/04* (2013.01); *F16L 57/005* (2013.01); *F16L 58/182* (2013.01)

(58) Field of Classification Search
CPC ............................... B65D 59/06; F16L 57/005
(Continued)

(56) References Cited

U.S. PATENT DOCUMENTS 1,000,375 A * 8/1911 Cable .................... B65D 59/06
138/96 T
1,806,932 A * 5/1931 Burnish ................ B65D 59/02
138/96 T
(Continued)

FOREIGN PATENT DOCUMENTS

DE         35 30 347 A1     1/1986

OTHER PUBLICATIONS

International Search Report dated Mar. 8, 2016 in PCT/FR2015/053632 filed Dec. 18, 2015.

*Primary Examiner* — James F Hook
(74) *Attorney, Agent, or Firm* — Oblon, McClelland, Maier & Neustadt, L.L.P.

(57) ABSTRACT

A protector for the male or female end of a threaded tubular connection for drilling or operating hydrocarbon wells, comprising a principal body, a first sealing gasket formed from a material which is less rigid than the material of the protector body and intended to make a seal with a surface of an end of the component, the principal body comprising a plurality of orifices through which the sealing gasket passes.

11 Claims, 3 Drawing Sheets

Figure 1:
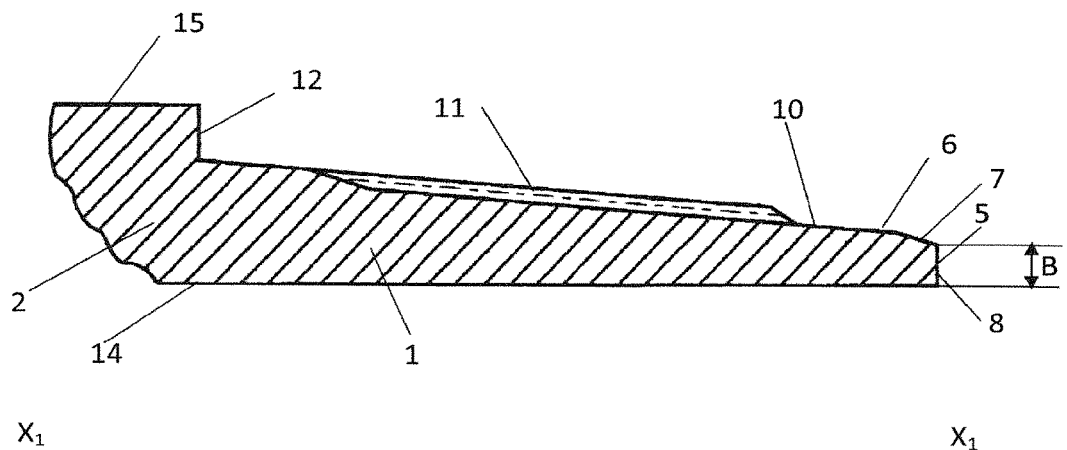

(51) Int. Cl.
    *B65D 59/06*         (2006.01)
    *E21B 17/043*       (2006.01)
    *F16L 15/04*         (2006.01)
    *F16L 58/18*         (2006.01)

(58) Field of Classification Search
    USPC .............................................. 138/96 R, 96 T
    See application file for complete search history.

(56) References Cited

U.S. PATENT DOCUMENTS

| | | | | |
|---|---|---|---|---|
| 1,807,565 A | * | 5/1931 | Burnish | B65D 59/00 |
| | | | | 138/96 T |
| RE18,184 E | | 9/1931 | Brown et al. | |
| 1,847,396 A | * | 3/1932 | Hochenauer | B65D 59/06 |
| | | | | 138/96 T |
| 3,858,613 A | * | 1/1975 | Musslewhite | B65D 59/06 |
| | | | | 138/96 T |
| 4,210,179 A | | 7/1980 | Galer | |
| 4,337,799 A | | 7/1982 | Hoover | |
| 4,415,005 A | * | 11/1983 | Janzen | E21B 17/006 |
| | | | | 138/89 |
| 4,487,228 A | * | 12/1984 | Waldo | B65D 59/02 |
| | | | | 138/89 |
| 7,857,007 B2 | * | 12/2010 | Kovacs, Jr. | B65D 59/02 |
| | | | | 138/89 |

* cited by examiner

PROTECTOR WITH A FLEXIBLE GASKET FOR THE MALE OR FEMALE END OF A COMPONENT OF A THREADED TUBULAR CONNECTION

The invention relates to threaded tubular components and more precisely to protectors for the ends of certain of these components, in particular tubulars for drilling or operating oil or gas wells.

The term "component" as used here means any element or accessory used to drill or operate a well and comprising at least one connection or connector or indeed threaded end, and intended to be coupled by means of a threading to another component in order to constitute a threaded tubular connection with this other component. The component may, for example, be a tubular element of relatively great length (in particular approximately ten metres in length), for example a tubular, or a tubular coupling several tens of centimetres in length, or indeed an accessory for these tubular elements (a hanger, a cross-over, a safety valve, a tool joint, sub or the like).

The components are generally connected one to another for dropping into the hydrocarbon wells or similar wells and to constitute a drill stem, a casing string or liner string or indeed a tubing string (operating columns).

Specification API 5 CT issued by the American Petroleum Institute (API), equivalent to ISO 11960:2004 issued by the International Standardisation Organisation (ISO), governs tubulars used as casing or tubing, and specification API 5B defines the standard threadings for these tubulars.

Specification 7 from the API defines threaded connections with a shoulder for rotary drill pipes.

The manufacturers of threaded tubular connection components have also developed threaded connections which are termed "premium" threaded connections, the threadings of which have specific geometries, and specific means which endow them with better performances in service, in particular in the matter of mechanical strength and sealing.

The threaded connections usually include one or two threadings, the threads of which are substantially trapezoidal and comprise a stabbing flank on the side of the threads directed towards the free end of the threaded element under consideration, a load flank on the side opposite to the stabbing threads, a thread crest with a non-zero width and a thread root, also with a non-zero width, the load flanks and the stabbing flanks having an orientation substantially perpendicular to the axis of the threaded element (for example, the API Buttress thread complying with the API standard has an inclination of +3° for the load flanks, and an inclination of +10° for the stabbing flanks).

Triangular or round threads also exist, also having stabbing flanks and load flanks, the thread crests and roots of which have a substantially zero width; however, these are not now used much as they run a great risk of jump-out.

The components mentioned above may comprise a threaded male end which is intended to be made up into a threaded female end of another drilling or operating component. Thus, it is vital that their male and female ends are damaged or contaminated or deteriorate to the least possible extent between the time they leave their production line and that at which they are used, but also between two successive uses. It will be understood that it is in fact necessary to protect not only the threading but also any sealing surface(s) and abutment(s) against corrosion, dust and shock (or knocks); each of these components has specific and complementary functions, in particular with a view to providing a seal when being used.

Furthermore, the ends of the components mentioned above were generally coated just before coupling, using an appropriate grease with anti-galling properties.

Replacing this grease with a combination of surface treatments and coatings applied in thin layers on the connections, i.e. on the threading, the sealing surface or the abutment, is becoming more and more routine.

As an example, U.S. Pat. No. 6,027,145, EP 1 211 451 and FR 2 892 174 in particular have proposed replacing the grease, which is applied to the end of the component using a brush, with a thin layer having a predetermined thickness of a dry lubricant based on particles of solid lubricants, applied at the factory.

These surface treatments and coatings have hardness properties, lubrication properties, anticorrosion properties which are adapted to the operational circumstances of coupling two connections or to the coupled condition, and it is necessary to adapt the protectors of the connection when the product is not in these circumstances, particularly during storage, handling and transport, in order to preserve the connection against mechanical removal and against contamination (sand, debris) which can be prejudicial to the efficiency of the product.

The coatings are also known as lubricating coatings and classified as dry or semi-dry solids or semi-solids. They have viscosity properties which are spread over a very wide range, from 500 mPa·s at 25° C. to more than 5000 mPa·s at 25° C., and some are even classified as "adhesives", i.e. after application to the surfaces of the connection, they could adhere to an object which touches them, and in particular may migrate to the fingers of an operator touching the coated surface of the connection. In contrast, others are classified as being rigid and have a certain hardness. These are desirable properties for facilitating connecting of two connections, but they give rise to problems with the protectors for the connections. These in fact have to protect the connections against shocks, they have to be firmly secured to the connection and they must have rigid bodies.

In order to obtain this protection, in general, and as required by the specification API 5 CT (in paragraph 12.2), a protector is placed on the male and female ends of the components of threaded tubular connections. A large number of devices of this type have been proposed, in particular in EP 0 148 807, US 2006/0042709, WO 2005/075877 and WO 2005/024282, the last three documents being more particularly aimed at protectors for connections which have already been coated with lubricant at the factory. It has been demonstrated that some of them run the risk of damaging the protective device when being put in position, and have an insufficient seal against air and humidity.

Protectors are devices with the principal function of protecting the functional surfaces of male or female connections against mechanical shocks. These surfaces may be one or more threading(s), one or more sealing surface(s), or one or more abutment(s). A protector generally has a substantially cylindrical shape and generally includes cushioning against mechanical shocks known as a shock absorber located at the end opposite to the free end of the protector, and a body, and a securing means. The solution generally adapted for securing a protector on a connection is to screw it onto the threading of the connection. This solution means that a simple action is associated with precise positioning. Thus, the protector comprises a threading which is capable of being screwed onto the threading of the connection. The threading is usually of the same type and pitch as that of the connection.

In addition, with the appearance of surface treatments and coatings applied to the connections, protectors have been provided with sealing means in order to reinforce the seal against moisture or air of regions comprising the functional surfaces of a connection. These sealing means are generally associated with the protector and are produced in shapes and materials which provide them with increased flexibility compared with the very rigid body of the protector, so that a portion of their surface makes contact with a surface of the facing connection with a view to producing a sealing contact.

However, the Applicant has noticed that the known solutions cannot be used to establish a satisfactory seal against water.

In fact, the prior art solutions do not provide a protector wherein a sealing gasket is maintained in position in a sufficiently effective manner to ensure a satisfactory seal.

Furthermore, some of the sealing gaskets of a protector are in contact with the surfaces of a connection having different surface conditions. It has been established that the coefficient of friction between a surface of a protector gasket and a surface of a connection may vary between 0.3 and 1.7. Thus, there may be a substantial amount of friction between the gasket and the connection. In another aspect, the invention proposes a lateral gasket with a better retention when positioning the protector on the connection and proposes an indicator to the operator of faulty retention of the gasket in its housing.

The aim of the invention is to improve the situation, in particular in terms of simplicity of implementation and robustness, while obtaining a quality seal and allowing the possibility of inspection.

The invention provides a protector for the male or female end of a threaded tubular connection for drilling or operating hydrocarbon wells, comprising a principal body, a first sealing gasket formed from a material which is less rigid than the material of the protector body and intended to make a seal with a surface of an end of the component, the principal body comprising a plurality of orifices through which the sealing gasket passes.

In one embodiment, the orifices are distributed about a periphery of the principal body.

In one embodiment, the sealing means comprises a ring, a sealing lip and a retaining extension.

In one embodiment, a retaining extension comprises a locking head.

In one embodiment, a retaining extension comprises a head stud.

In one embodiment, the principal body comprises a plurality of bores into which a plurality of orifices open.

In one embodiment, the principal body comprises a circumferential groove into which a plurality of orifices open.

In one embodiment, the sealing means is overmoulded onto the body of the protector and penetrates into at least one orifice.

In one embodiment, the sealing gasket is formed from an elastomer.

In one embodiment, the sealing gasket is intended to make a seal with a lateral surface of the end surface of the component.

The invention also concerns a method for fitting a protector, comprising the steps of:
  placing a first sealing gasket on the body of the protector;
  pushing a retaining extension through an orifice;
  cutting off the head stud.

In one embodiment, the method also comprises the step of:
  pulling on a head stud of a retaining extension until the locking head passes completely through the orifice.

The term "male connection" means the portion of a component provided with machined and/or machine-ground surfaces intended to form a connection with a corresponding female portion, and the term "body" means the remaining portion of a component provided with surfaces which have been rolled. A male connection generally has one or more threading(s) located on an exterior lateral wall and a corresponding female connection has one or more corresponding threading(s) on an interior lateral wall of the component.

Figure 2:
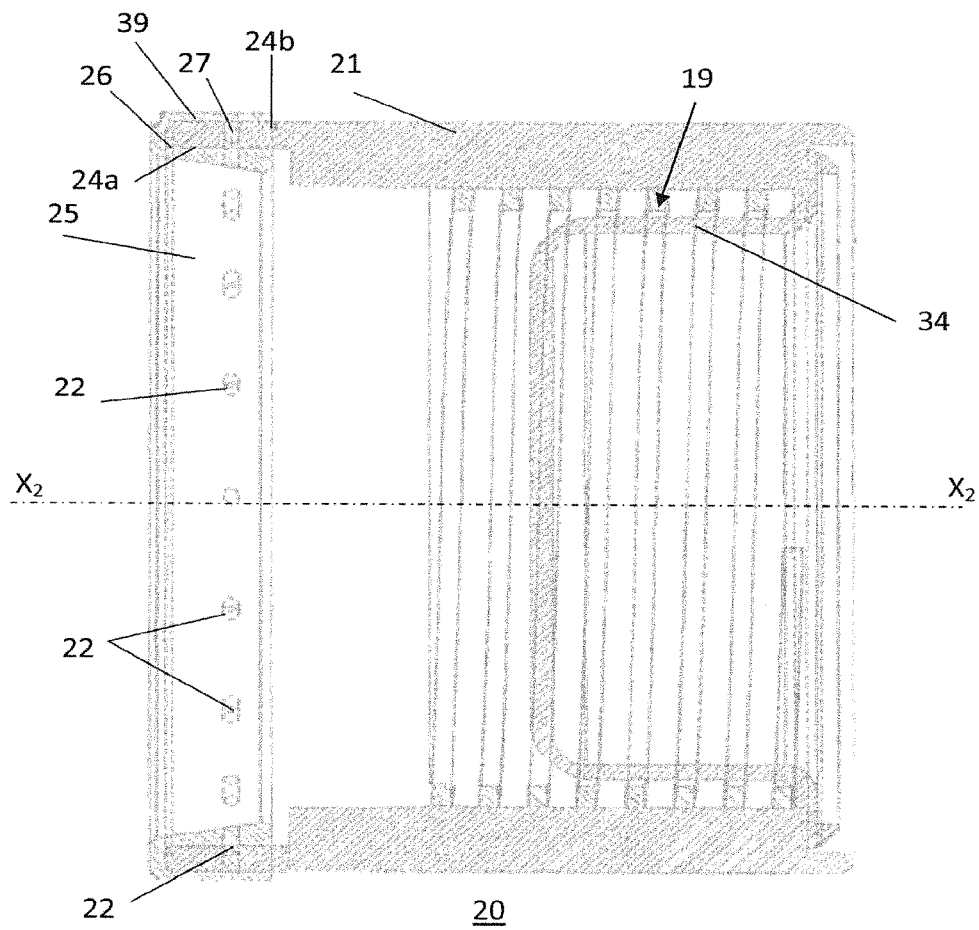
Figure 3A:
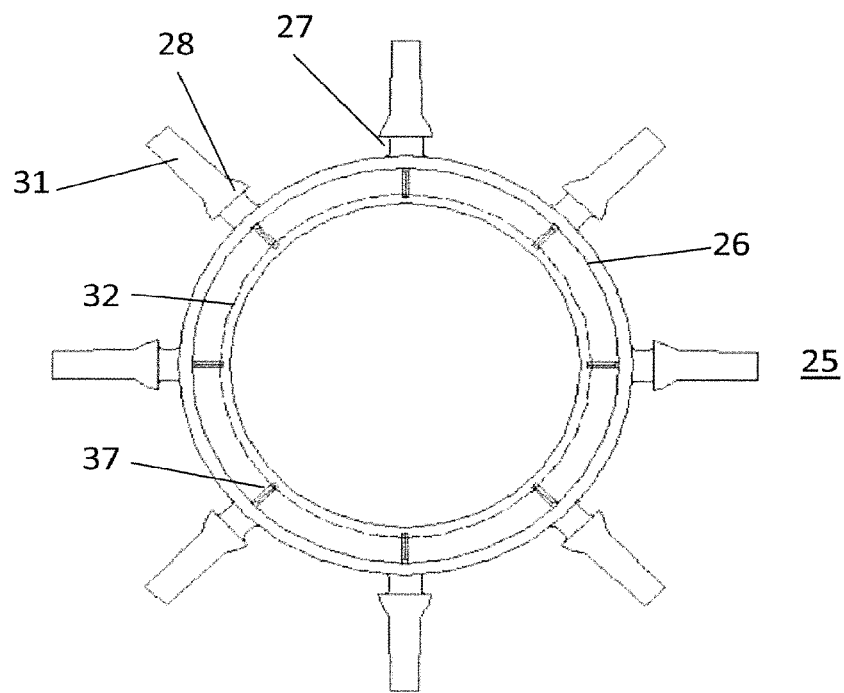
Figure 3B:
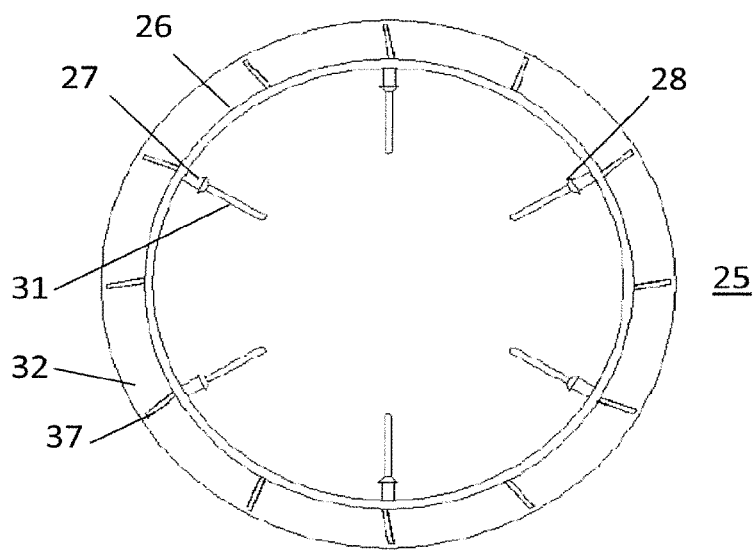
Figure 4:
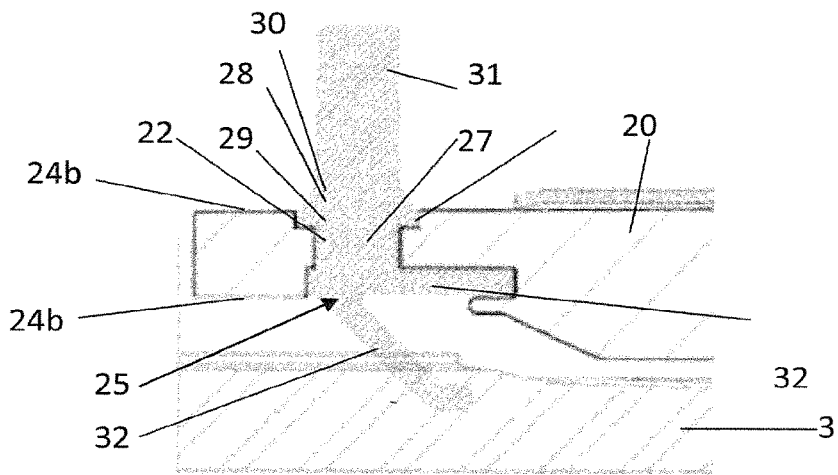
Figure 5:
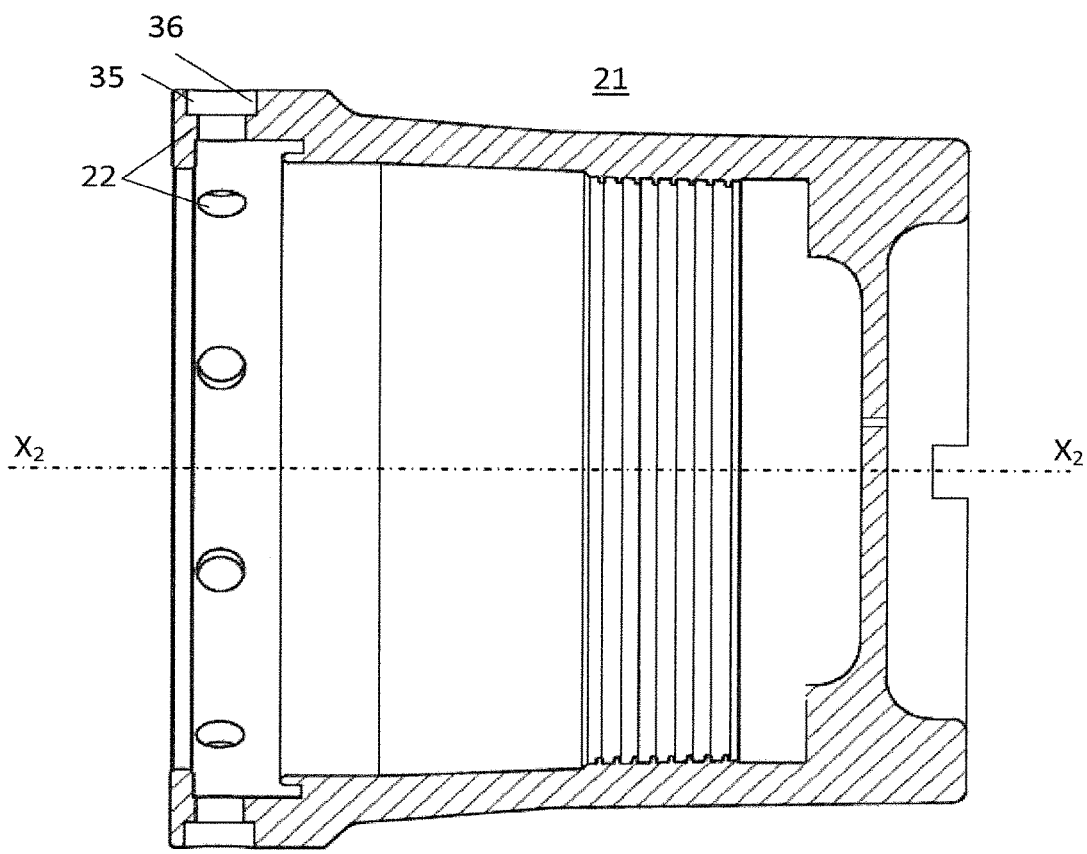

Further characteristics and advantages of the invention will become apparent from the following description and the accompanying drawings, in which:

FIG. 1 diagrammatically illustrates a sectional view of a male end of a tubular component, FIG. 2 diagrammatically illustrates, in a longitudinal sectional view, a protector for a male connection in accordance with one embodiment of the invention, FIGS. 3a and 3b diagrammatically illustrate, in front view, annular protector gaskets for a male and female end in accordance with one embodiment of the invention, FIG. 4 diagrammatically illustrates, in a detailed sectional view, a protector in accordance with one embodiment of the invention mounted on a connection, FIG. 5 diagrammatically illustrates, in section, a protector body in accordance with one embodiment of the invention.

The accompanying drawings not only serve to complete the invention, but also contribute to its definition if appropriate. They do not limit the scope of the invention.

The invention is intended to improve the protection of the threaded end of a tubular component of a threaded tubular connection (intended for drilling or operating a hydrocarbon well or the like) against mechanical damage, contamination (chemical and equipment) and deterioration (corrosion) between the time it leaves its production line and the time when it is used (with several possible connecting and breaking-out operations for the protection device), but also between two successive uses, while reducing the risks of loss of positioning of a sealing gasket.

It is also aimed at allowing rapid and reliable on-site fitting and removal of the protector on one end of the component and easy inspection of the condition of the threadings before use or between two successive uses of the component. It avoids using additional products during fitting.

FIG. 1 represents a sectional view of a portion of a tubular component which comprises a tubular body 2 and at least one male connection 1. The male connection is generally produced by machining the tubular body. The tubular body comprises an exterior lateral wall 15 and an interior lateral wall 14. The male connection 1 of FIG. 1 has a principal axis $X_1$.

The male connection 1 comprises an outer threading 11 intended to be made up onto the female connection of another tubular component via the inner threading (not shown) of the corresponding female connection. The male connection 1 also comprises, on an outer lateral surface of the connection 10, an exterior annular surface 12, an interior annular surface 5, a sealing surface 6 and an interior lateral wall 14.

The male connection 1 of the component is terminated by a distal annular surface 5 with a substantially transverse orientation. This distal annular surface may be simple, planar, as represented in FIG. 1, and alternatively it may be non-planar, for example conical. The distal annular surface may optionally comprise an abutment surface 8 which acts so as to bear on a corresponding surface of the corresponding female connection once made up, in order to create a sealing surface or to transmit a torque.

The distal annular surface 5 of a male connection is an interior annular surface. The distal annular surface of a female connection is an exterior annular surface.

A distal end surface is an annular surface located downstream of the threading of a connection. A first element of a component is downstream of a second element of a component when the first element is axially positioned closer to the free end of the component. A first element of a component is upstream of a second element of a component when the first element is axially positioned further away from the free end of the component.

The exterior annular surface 12 of a connection may comprise an exterior abutment surface, an exterior bearing surface (also known as a sealing surface) and/or a linking surface between the zone comprising the outer threading 11 and the exterior lateral wall 15 of the tubular body 2.

A connection threading 11 may comprise perfect threads and vanishing or imperfect threads. In fact, when a threading is tapered, it may be subdivided into a portion which is said to have perfect threads with a profile which is constant and without irregularities or imperfections (for example of the burr type) and a portion which is said to have vanishing or imperfect threads the height of which decreases progressively and which has a profile which may have irregularities or imperfections in a manner such as to provide a clearance between the thread crests and roots. Imperfect threads are practically incapable of accommodating screwing forces because they do not come into contact with the surfaces of the threads of the mated portion.

A male connection 1 may also comprise one or more metal/metal sealing surfaces which correspond with sealing surfaces of a female connection (downstream of the threading, upstream of the thread or between two threaded portions). A male connection 1 may also comprise two exterior threadings.

FIG. 2 is a detailed sectional view of an embodiment of the invention in a plane comprising the axis $X_2$. A protector 20 in accordance with the invention comprises a principal body 21, substantially of revolution and having an axis $X_2$, and at least one annular gasket 25. The protector 20 also comprises at least one threading 19 which can mesh with the threading 11 of the connection 1.

Since the protection is primarily mechanical, the body 21 must have a certain rigidity while being capable of at least partially absorbing shocks. To this end, the body 21 may, for example, be produced by injecting a thermoplastic material into a suitable mould. Of the various families of thermoplastic materials which may advantageously be used, particular mention may be made of blends based on polycarbonate, such as polycarbonate-polyester (PC-PBT or PC-PET) and high or ultra-high density (PE-HD, PE-UHD) polyethylenes (PE).

Appendix I of the specification API 5CT, 2011 edition, lists the requirements for threading protection devices, in particular minimum values for the axial and bias (45°) shock resistance for three temperatures (−46° C., +21° C. and +66° C.).

It is more particularly possible, for example, to select a PE-HD produced by DOW and sold under the trade name DMBA-8904-NT7 or produced by BASELL and sold under the trade name LUPOLEN 4261 AG UV 6005, a PE-UHD produced by TICONA and sold under the trade name GUR 5113, or a PC-PBT produced by BAYER and sold under the trade name MAKROBLEND 57916.

The body 21 may optionally be partially (at least) formed with cells, in particular in its thick portions, in order to absorb shocks better.

The body 21 may also be strengthened by a reinforcement, for example a metal skirt, in order to strengthen its rigidity or improve its shock resistance.

In the embodiment of FIG. 2, the body 21 comprises a radial partition 34 forming a plug. In a variation (not shown), the radial partition 34 is provided with openings, or it might even be absent.

The sealing gasket 25 is intended to be placed in contact firstly with a surface of the tubular component and secondly with a surface of the body of the protector.

The sealing gasket 25 is produced from a flexible material, i.e. a deformable and elastic material, which means that it can substantially regain its initial shape. The sealing gasket is produced from a material with less rigidity than the material of the protector body, i.e. a Young's modulus which is lower than that of the material of the body of the protector.

Said material may have an elongation at break of more than 300%. To this end, it may, for example, be produced by injecting a flexible material which is corrosion-resistant, resistant to chemical attack, in particular by industrial solvents and acids, and resistant to prolonged exposure to UV radiation, retaining its mechanical properties. Examples of the various families of materials which may advantageously be used and which may in particular be cited are neoprene elastomers such as Baypren 210 produced by LANXESS, EPDMs such as Nordel IP Hydrocarbon Rubber produced by DOW, nitriles or one of these materials disposed in a polyolefin matrix. The sealing gasket 25 may be constituted by said material.

In one embodiment, the sealing device 25 is placed in contact with the component at least in a portion which is located downstream of a threading 19 of the male end 3 or a threading of the female end, and on the other hand of the body 21. More precisely, the sealing device 25 is intended to provide a first seal downstream of the threading 19.

A sealing gasket 25 comprises a ring 26 and a retaining extension 27 intended to be introduced into an orifice 22 formed in the principal body 21 of the protector 20.

Advantageously, the body 21 has a plurality of orifices 22 through which a plurality of retaining extensions 27 can be passed, which means that positioning of the gasket on the protector during fitting can be facilitated and the annular gasket can be securely retained on the protector during manipulation and during operations for screwing up/unscrewing the protector onto/off the end of the tubular component. The sealing gasket is retained by frictional forces between the walls of an orifice 22 and the surface of a retaining extension 27 and/or by a tight fitting clearance between the orifice and the retaining extension. Fitting in this manner means that a sealed connection exists between the gasket and the protector body.

An orifice is produced directly during moulding of the protector, or it may be produced by machining into the body of the protector, or indeed by piercing the body of the protector. In this latter case, the orifice preferably has a circular section for reasons of simplicity and machining costs. An orifice may have sections with different shapes, for example triangular or rectangular or polygonal.

Preferably, a retaining extension has a section with the same shape as the section of the orifice.

In the embodiment of FIG. 2, the orifices 22 are formed on the periphery 23 of the protector in order to allow a sealing gasket to be positioned which is intended to come into contact with the interior lateral surface of a male end or the exterior lateral surface of a female end.

Advantageously, the orifices are through-holes, which means that the retention of the gasket on the body of the protector can be improved, and which also allows the operator to detect any problems with fitting the gasket on the body of the protector.

FIG. 4 shows, in a detailed view in section, a sealing gasket 25 mounted on the body 21 of the protector 20, and comprising a retaining extension 27 and also comprising a locking head 28 which has a section when in the uncompressed condition which is greater than the section of an orifice 22 and determined in a manner such that in the compressed condition, the locking head 28 can pass through an orifice 22. When the gasket has been fitted onto the protector, the ring 26 bears on a first surface 24a of the body of the protector, a retaining extension 27 extends through the orifice 22, the orifice passing through the body of the protector and opening on the one hand onto the first surface of the body of the protector, and on the other hand onto a second surface 24b of the body of the protector.

Preferably, a locking head 28 has the shape of a tapered portion, comprising a larger diameter base 29 and a smaller diameter base 30, the locking head 28 being joined to a retaining extension 27 via its larger diameter base 29. This facilitates passing the locking head through an orifice 22, a small diameter base penetrating into the orifice first and more easily, and it also improves the retention of the gasket, because the large diameter base is positioned so as to bear on a surface of the opening of the orifice when the gasket is fitted on the protector and resists withdrawal of the retaining extension from the orifice.

The retaining extension 27 optionally comprises a head stud 31 connected to the retaining extension via the locking head 28. The head stud 31 is joined to the locking head 28 via its smaller diameter base.

The head stud 31 can be used by an operator to force the locking head 28 and the retaining extension 27 through the orifice 22 using a squeezing tool, for example. This in particular means that the dimensions of the locking head 28 can be increased relative to the dimensions of the orifice 22 in order to improve the retention of the sealing gasket 25. With this increase in the dimensions of the locking head, it may become impossible for an operator to place the gasket in position without using a special tool such as pliers, and the presence of a head stud 31 prevents the locking head from being damaged by said tool.

Advantageously, a head stud 31 can be cut off after fitting the sealing gasket on the protector without compromising the retention of the sealing gasket on the protector.

Tests carried out by the Applicant have demonstrated the impossibility of removing a gasket in accordance with this latter embodiment except, for example, by cutting or perforating the gasket at the locking heads, or by intentionally and irreversibly damaging the gasket.

In a variation, an orifice 22 opens into a bore 35 formed on the second surface of the body of the protector opposite to the first surface, on which the ring 26 of the annular gasket 25 bears. The bore 35 has a section with dimensions which are higher than that of the locking head 28. This bore can be used to protect the locking head against a shearing tool which could cut or tear said locking head.

In a variation shown in FIG. 5, the bore 35 may be a circumferential groove 36.

FIG. 3a represents a front view (from upstream) of a sealing gasket 25 in accordance with an embodiment of the invention, for fitting to a male connection protector. A sealing lip 32 extends towards the interior of the ring 26. Retaining extensions 27 are regularly distributed about the circumference of the ring 26 and extend outwardly from said ring. The retaining extensions 27 comprise locking heads 28 and head studs 31.

The sealing lip extends over the whole of the circumference of the protector body in order to create a circumferential seal over a surface of a connection 3. The sealing lip 32 may optionally be connected to the ring 26 via ribs 37.

FIG. 3b represents a front view (from upstream) of a sealing gasket 25 in accordance with an embodiment of the invention, for fitting to a female connection protector. A sealing lip 32 extends towards the exterior of the ring 26. Retaining extensions 27 are regularly distributed about the circumference of the ring 26 and extend inwardly from said ring. The retaining extensions 27 comprise locking heads 28 and head studs 31.

Preferably, the sealing lip 32 is located substantially axially at the same level as the orifices 22, which means that the material used to produce the sealing gasket can be reduced and also the risks of tearing the gasket can be reduced.

In one embodiment, the sealing gasket 25 is in contact with the male or female end of the component with only one lateral surface 10 of said end, and is not in contact with a threading of the end when fitted.

In one embodiment represented in FIG. 2, the annular gasket 25 is overmoulded onto the body 21. The annular connection comprises a ring 26 linked to a first surface of the protector body 24a and a plurality of retaining extensions 27. The annular gasket of FIG. 2 further comprises an optional secondary ring 39 linked to the second surface of the protector body 24b. The retaining extensions 27 extend from the ring 26 to the optional secondary ring 39. The presence of orifices means that the material of the sealing device can flow through them during overmoulding. During cooling, the material of the sealing device solidifies and ensures that the sealing device becomes attached to the principal body. Attachment occurs at the contact surfaces between the overmoulded material and the body of the protector. In the case shown, adhesion occurs between the ring 26 and the first surface of the protector body 24a and between the optional secondary ring 39 and the second protector body surface 24b, and the adhesion is improved by the retaining extensions which make contact with the surface of the orifices 22.

Adhesion is further improved when the sealing gasket comprises an optional secondary ring 39; the retaining extensions extend from the ring 26 to the optional secondary ring 39, these three elements being linked by the material into a coherent assembly.

Further, in the context of an injection overmoulding process, the presence of orifices facilitates injection by helping with filling and with the flow of the material into the mould.

More advantageously, the orifices are distributed over a periphery of the principal body.

In an advantageous and complementary manner, the protector comprises a secondary sealing device which can be placed in contact on the one hand with a surface of said component at least in the free terminal portion of the end of the component, and on the other hand with said principal body so as to provide a seal upstream of said threading.

The advantageous complementary characteristics associated with the first sealing device may also be applied to the secondary sealing device. Thus, the secondary sealing device may in particular be integral with the principal body, in particular by the use of orifices in the body of the protector through which a portion of the sealing device passes and/or it is overmoulded onto the principal body.

The invention claimed is:

1. A protector for the male or female end of a threaded tubular connection component for drilling or operating hydrocarbon wells, comprising:
   a principal body; and
   a first sealing gasket formed from a material which is less rigid than a material of the principal body and intended to make a seal with a surface of an end of the component,
   wherein the principal body includes a plurality of orifices through which the sealing gasket passes,
   wherein the principal body includes a plurality of bores into which the plurality of orifices open and through which the sealing gasket passes, and
   wherein a diameter of each of the plurality of bores is greater than a diameter of each of the plurality of orifices.

2. The protector according to claim 1, wherein the orifices are distributed about a periphery of the principal body.

3. The protector according to claim 1, wherein the sealing gasket includes a ring, a sealing lip and a retaining extension.

4. The protector according to claim 3, in which the retaining extension comprises a locking head.

5. The protector according to claim 4, wherein the locking head has a tapered shape such that a diameter of a base of the locking head is larger than a diameter of an end of the locking head positioned outside of the bore, and
   wherein the base of the locking head is positioned within the bore and bears on an opening surface of the orifice that faces in a direction of the bore.

6. The protector according to claim 3, in which the retaining extension comprises a head stud.

7. A method for fitting a protector according to claim 6, comprising:
   placing a first sealing gasket on a body of the protector;
   pushing a retaining extension through an orifice; and
   cutting off the head stud.

8. The method according to claim 7, further comprising:
   pulling on a head stud of a retaining extension until the locking head passes completely through the orifice.

9. The protector according to claim 1, wherein the sealing gasket is overmoulded onto the body of the protector and penetrates into at least one orifice.

10. The protector according to claim 1, wherein the sealing gasket is formed from an elastomer.

11. The protector according to claim 1, wherein the sealing gasket is intended to make a seal with a lateral surface of the end surface of the component.

* * * * *